June 20, 1967 R. E. MURRAY 3,327,068

INDEXING APPARATUS FOR DICTATION SYSTEMS

Filed March 13, 1963 2 Sheets-Sheet 1

INVENTOR.
ROBERT E. MURRAY

BY George H. Fritzinger

AGENT

INVENTOR.
ROBERT E. MURRAY
BY George H. Fritzinger
AGENT 3,327,068
Patented June 20, 1967

3,327,068

INDEXING APPARATUS FOR DICTATION SYSTEMS

Robert E. Murray, Millburn, N.J., assignor to McGraw-Edison Company, Elgin, Ill., a corporation of Delaware Filed Mar. 13, 1963, Ser. No. 264,836
1 Claim. (Cl. 179—100.2)

This invention relates to dictating machine systems for recording dictation on a record medium and for later transcribing the same, and more particularly the invention relates to improvements in the indexing apparatus employed in such systems for apprising the transriber where corrections have been made in the recorded dictation as well as where units of dictation are ended.

It is the common practise to provide dictating machines with indexing means by which the user can make registrations in a special relationship to the positioning of the recording head on the record medium to indicate to the transcriber the points on the record medium where "corrections" and "lengths" have been made, the term "lengths" being herein used to mean points on the record medium where separate items or units of dictation are started and ended. These indexing registrations are usually provided in the form of visible marks on an indexing slip separate from the record medium. Such visible mark by itself gives merely an indication as to the point on the record where the dictator called for a correction. Since corrections often call for changes in prior portions of ones' recorded dictation, it is necessary in the proper use of a transcribing machine that the secretary first reproduce the areas on the record medium where corrections have been called for so as to ascertain the nature of the corrections before transcribing the dictation.

In practise, however, secretaries soon become aware that each "correction" usually pertains to the immediate portion of the record dictation just preceding the point where the dictator called for the correction, and so rather than first scanning all correction areas to ascertain beforehand the nature of the respective corrections, the secretary will endeavor to watch the correction points on the index slip and scan ahead only when the index pointer has approached closely to a correction mark on the index slip. Needless to say, the secretaries will oftimes inadvertently fail to keep close watch of the index slip and will transcribe the dictation to the very point where the dictator called for a correction before she becomes aware that a correction is to be made. If she finds then that the correction involves more than a word or so she may have to discard the whole page on which she is working. Even when the secretary first scans all correction areas on the record medium before starting the typing of a dictation unit, she may become so engrossed in listening to the recorded dictation and in typing the same that she fails to realize that she is approaching a point where a correction is to be made. By the time she realizes that a correction is to be made, or hears the word "correction" she may already have typed incorrect material and may have to retype the page at a great loss of time.

The present invention resides in providing a prewarning signal of a visible or audible character to alert a secretary positively of an approaching correction at a suitable time before the point is reached where the actual correction is called for. Upon hearing the prewarning signal the secretary is alerted immediately to scan ahead and ascertain the nature of the oncoming correction before proceeding further with the transcribing operation. In the event the secretary had predetermined the nature of the respective correction before starting the transcription of a dictation unit the prewarning would remind her of the particular correction just ahead to enable her to proceed with the transcribing operation and to type the corrected change without interruption. With the use of this prewarning signal fed to the secretary through the receiving instrument she need not even have to keep close watch of the index slip during the transcribing operation and can thus devote her full attention to the listening and typing of the dictated material. The benefits are a greater assurance that corrections will be handled properly with a minimum interruption in the transcribing procedure, that secretaries can give greater concentration to the subject matter of the recorded dictation since they no longer have to keep a close watch of the index slip, and that a considerable time can be saved because of the reduced likelihood of ever typing incorrect material requiring the discarding of whole pages of typed dictation. Although the invention is primarily useful in connection with "correction" notations by the dictator it is also useful in connection with "length" notations because a prewarning of a "length" notation will enable the secretary to space better the typing at the end of a page or letter.

It is accordingly an object of my invention to provide an improved indexing apparatus for dictation recording and transcribing systems which will enable a dictator's "correction" and "length" notations to be taken into account more efficiently and with less chance of error when the recorded dictation is transcribed.

It is another object to provide such improved indexing apparatus which is adapted to enable a secretary to transcribe recorded dictation and take into account the dictator's "correction" and "length" notations without requiring a direct attention to the indexing apparatus.

It is another object to provide such improved indexing apparatus which will automatically provide a prewarning to the secretary of an indexing notation when in the transcribing operation she approaches the point where such notation was made.

It is a further object to provide such prewarning in the form of a signal recorded on the record medium and transmitted to the secretary during the transcribing operation via the transcriber's receiving instrument.

It is a further object to provide a novel apparatus for recording such prewarning signals on the record medium in superimposed relation to the recorded dictation without marring the intelligence thereof whenever a dictator manipulates the indexing aparatus to make an indexing registration.

These and other objects and features of the invention will be apparent from the following description and the appended claim.

In the description of the invention, reference is had to the accompanying drawings, of which:

Figure 1:
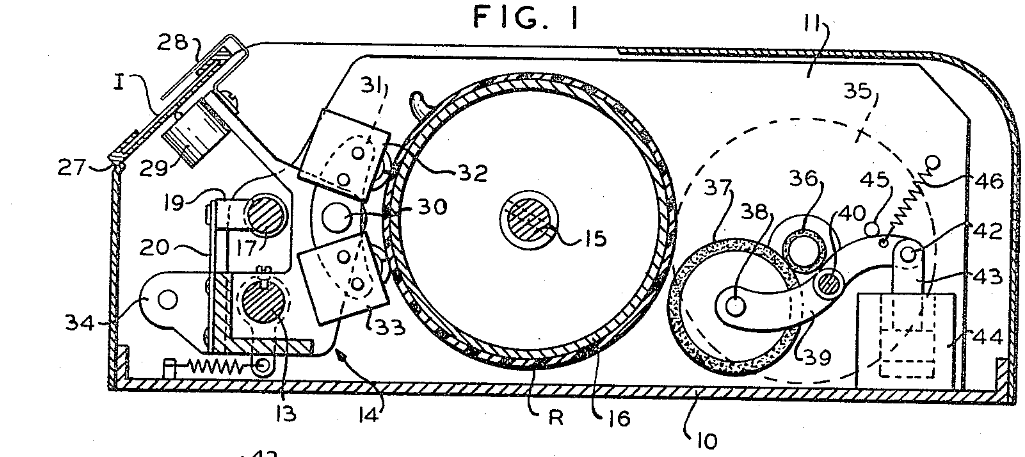
FIGURE 1 is a side elevation of an illustrative recording and reproducing machine incorporating means for providing a prewarning indexing signal on the record medium responsive to the dictator making an indexing registration.
Figure 2:
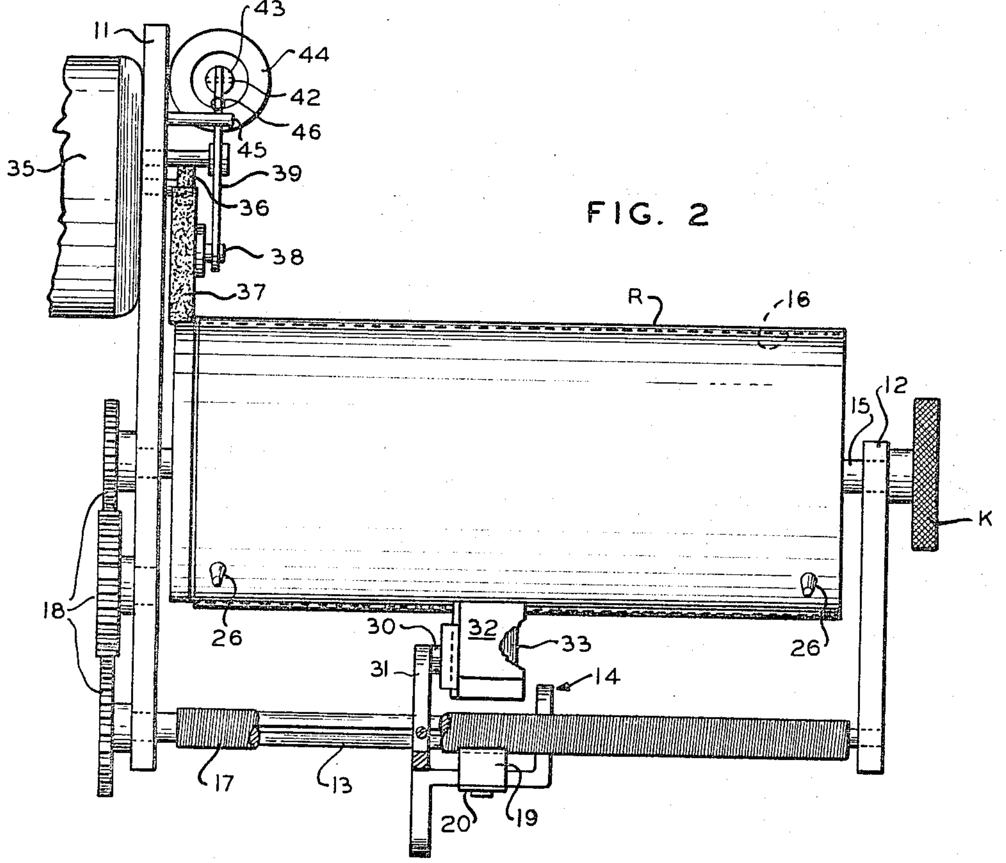
FIGURE 2 is a fractional top plan view of the machine shown in FIGURE 1 with parts broken away.

The recording and reproducing machine shown by way of example in FIGURES 1 and 2 may have a base plate 10 provided with two parallel upright standards 11 and 12. These standards carry a cross rod 13 for slidably supporting a carriage 14, and provide bearings for a shaft 15 carrying a rotatable record support in the form, for example, of a drum 16, as well as bearings for a feed screw 17. The feed screw is in constant drive coupling with the shaft 15 as by means of a gear train indicated at 18. A feed nut 19 is mounted resiliently on the carriage by way of a cantilever spring 20. This feed nut engages the feed screw to propel the carriage slowly along the drum as the latter is rotated.

The drum 16 carries a removable record medium which may be in the form of a cylinder or in the form of a sheet record R attached to the drum by two radial hooks 26 and driven in wrap around relation thereto with preferably a slight overlap. The drum may be turned to load and unload a sheet record by a manual knob K. The sheet record has a magnetic coating on its outer surface for recording thereon and reproducing therefrom by means of a suitable record-reproduce head later described. Alternatively, the record medium may be in the form of a belt trained around the drum and an idler roller not shown, or it may be a disk, or of any other suitable form.

Pivoted at 30 to the carriage 14 is a rocker beam 31 carrying a magnetic record-reproduce head 32 at one end and a magnetic index head 33 at the other end. The record-reproduce head 32 is of the composite type having an erase gap ahead of the record-reproduce gap such as is well known in the art. The index head 33 is simply a recording head and is set back from the record-reproduce head 32 by a suitable distance such as one or two track convolutions on the record medium. The heads engage the record medium R with the necessary pressure for establishing firm contact therewith in response to their weight and/or any torsional biasing of the carriage 14 about its support rod 13. Whenever it is desired to shift the carriage manually, it is tilted counterclockwise, as by the arm 34 extending forwardly therefrom, to disengage the heads from the record medium and to disengage the feed nut 19 from the feed screw 17, and is then shifted by the desired distance. Thereupon, the carriage is released from its tilted position to reengage the feed nut with the feed screw and to return the heads into contact with the record medium.

Although a record medium of the magnetic type is a preferred one, the record medium may alternatively be, for example, of a thermoplastic material and the heads 32 and 33 may have respective styli for recording on the record medium by the embossing process. In this case the index head 33 would have a "soft" engagement with the record medium, such as is characteristic of a reproducer stylus, so that it would not mar the intelligence of the recorded dictation, but the coupling of the stylus to the activating coil of the head would be sufficient and/or the signal fed to the head would be of a level to enable the signal to be recorded in superimposed relation to the recorded dictation to enable the secretary readily to hear the signal as the dictation is transcribed. When the record medium is of the magnetic type the indexing head 33 provides no problem since it is only necessary that the head be in registration with a prerecorded track and that no signal be fed thereto except during the moment when an indexing signal is to be recorded, as will appear.

The drum 16 may be driven by a motor 35 having a drive wheel 36 connected or geared thereto for a proper driving speed. The drive wheel is coupled to the drum by a friction train comprising an intermediate drive wheel 37. This intermediate wheel is journaled at 38 to one end of a rocker 39 itself pivoted at 40 to the side standard 11. Pivotally connected at 42 to the other end of the rocker is the armature 43 of an electromagnet 44. The rocker is biased counterclockwise against a stop pin 45 on the standard 11 by means of a tension spring 46. By reason of this biasing the intermediate drive wheel is held normally disengaged from the drum 16. Upon energizing the electromagnet 44 the wheel 37 is engaged drivingly with the wheel 36 and the left end portion of the drum 16 to impart driving movement to the latter. By way of example, one or more of the drive elements may have friction tires of yieldable material to provide for quick start and positive drive of the drum by the drive motor. As the drum is so driven the carriage is progressively moved by the feed screw 17 so that the record-reproduce head 32 scans a helical track on the record medium and the index head 33 follows in registration with this track at a suitable track distance from the record-reproduce head.

Figure 3:
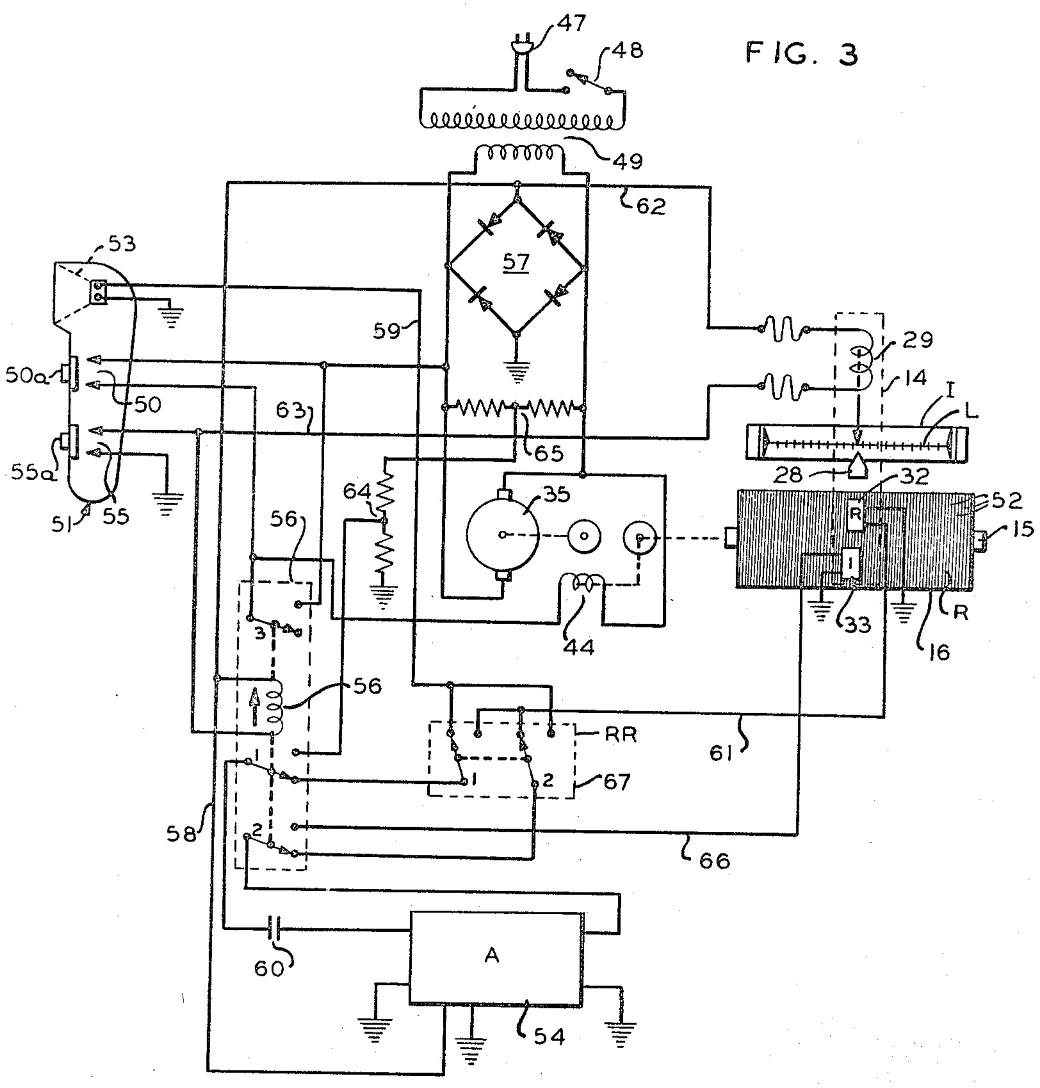
FIGURE 3 is a schematic circuit diagram of the illustrated form of the invention embodied in the machine of FIGURES 1 and 2.

Mounted on a forward sloping wall of the housing of the machine is a holder 27 for an index slip I, and secured to the carriage 14 is a pointer 28 which extends upwardly through an opening in the housing and across the top face of the mounted slip. As shown in FIGURE 3, the index slip has a central scale L which with reference to the pointer 28 enables the position of the carriage to be identified at any time.

Mounted also on the carriage at the back side of the index slip holder 27 is a solenoid 29 with a punch element on its armature by which indexing registrations can be made in the index slip I directly below the pointer 28 to denote positions of the carriage where index notations have been made by the dictator. Typically, two such solenoid operated punches are provided, one for "correction" marks and one for "length" marks, but only a single punch for "correction" marks is herein described by way of illustrative example.

In the schematic circuit diagram of FIGURE 3, many of the circuits are shown single line with ground return to simplify the description. Power may be supplied to the machine as from a 110 volt line (not shown) via a line plug 47, an on-off switch 48 and a power transformer 49. The drive motor 35 may be connected directly across the secondary winding of the transformer 49 to run whenever the on-off switch is closed. The clutch electromagnet 44 may also be operated from the secondary winding of the transformer 49 through a start-stop switch 50 mounted in a dictator's handpiece 51. This start-stop switch is biased into open position and is closed whenever the switch button 50*a* is pressed. Upon so pressing the switch button the clutch is engaged and the drum 16 is started rotating. By the feeding means hereinbefore described, the carriage 14 is advanced progressively as the drum is rotated to cause the record-reproduce head 32 to define a helical track on the record R indicated by the lines 52.

In the head portion of the dictator's handpiece 51 is a transducer 53 usable as a microphone during recording and as a speaker during reproducing. This transducer is connectable through an amplifier 54 and a record-reproduce interchange switch 67 to the record-reproduce head 32. The amplifier receives D.C. power from a full wave rectifier 57 connected across the secondary winding of the power transformer 49, the connection to the amplifier being by way of a lead line 58 and ground return to provide power to the amplifier whenever the on-off switch 48 is closed. Further, the full wave rectifier 57 provides an available source of D.C. current to operate an indexing relay 56 as well as to provide a source of 120 cycle signal current for indexing purposes. It will be understood that the RR switch 67 may be relay operated and controlled remotely at the handpiece 51 or that it may be directly manually operated as indicated in FIGURE 3.

During recording the RR switch 67 is thrown to the left and the indexing relay 56 is left unoperated both as shown in FIGURE 3. The microphone speaker 53 operating as a microphone is connected from ground through line 59, pole 1 left contact of the RR switch 67, pole 1 lower contact of the indexing relay 56, condenser 60, amplifier 54, pole 2 lower contact of the indexing relay 56, pole 2 left contact of the RR switch 67, lead 61 and record-reproduce head 32 acting as a recorder to ground. Thus, upon pressing the start-stop button 50*a* to start the machine, and then speaking into the microphone, the spoken voice will be recorded on the record medium R. Upon the user throwing the RR switch 67 to the right the connections of the amplifier 54 to the microphone speaker 53 and record-reproduce head 32 are reversed to connect the head 32 acting as a reproducer to the input of the amplifier and the microphone speaker 53 acting as a speaker to the output of the amplifier. Upon the RR switch 67 being so thrown to reproduce position and the start-stop button 50*a* being pressed the machine is started to reproduce recorded dictation scanned by the head 32.

Whenever during a recording operation the dictator wishes to record a "correction" notation he will first press the correction button 55*a* and then press the start-stop button 50*a* and say "correction" followed by an explanation of the correction. When he presses the correction button 55*a* he closes the switch 55 to provide D.C. power from the rectifier 57 through lead 62, the solenoid operated punch 29, lead 63, switch 55 and ground. The solenoid operated punch 29 is therefore actuated to make a punch mark in the index slip in line with the pointer 28. Further, in accordance with the present invention, the pressing of the index button 55*a* activates the indexing relay 56 from the rectifier 57 through the lead 58, the coil of the indexing relay 56, switch 55 and ground. The activation of the indexing relay produces the following results: (1) it closes switch pole 3 of the indexing relay with its respective contact to complete a circuit paralleling the start-stop switch 50 whereby to start the machine, (2) it closes switch pole 1 of the indexing relay with its upper contact to connect the input of the amplifier A to a voltage divider 64 connected across the A.C. source applied to the rectifier 57, and (3) it connects the output of the amplifier 54 via the switch pole 2 of the indexing relay, lead 66 and the index head 33 to ground. Since the input of the amplifier is now connected between ground and a circuit leading through the full wave rectifier 57 to ground, the amplifier will receive an A.C. signal comprising predominantly a 120 cycle note which for the present purposes is used as a prewarning indexing signal. In view of this indexing signal being fed through the amplifier to the indexing head 33 the signal will be recorded in superimposed relation to the recorded dictation during the interval when the dictator presses the correction button 55*a*. Moreover, this indexing signal will be recorded starting at a point backspaced from the point where the dictator recorded the correction notation by the distance the index head 33 is spaced behind the record-reproduce head 32.

The recorded dictation is reproduced by a secretary typically with the use of a transcribing machine which is a standard reproducing machine such as is herein described provided with control means for easily backspacing the carriage by remote control and for alternately starting and stopping the machine by successively pressing a start-stop control button. Such transcribing machine is well known in the art and need not be herein described. Suffice for the present to say that when a secretary has transcribed to within the preset distance by which the indexing head 33 is spaced behind the record-reproduce head 32, she will hear the prewarming indexing signal to apprise her to check at that instant the nature of the ensuing correction so that she will not proceed ahead to type erroneous material. Having once so ascertained the nature of the correction she is able to proceed ahead and incorporate the corrected material with the minimum of attention and interruption. Thus, the chance of her typing erroneous material requiring a discarding of a typed sheet is not only greatly mitigated but also she is relieved of the necessity to keep a close watch on the indexing slip as to ensuing corrections because she is alerted beforehand of each correction through her listener's headset. She can therefore devote her full attention to the material being transcribed to carry out the transcribing operation efficiently and with greater speed. In fact, the only usefulness of the index slip with the present invention is to enable a secretary to precheck the points where corrections have been made so that she will be better prepared to incorporate the corrected material at each correction point. Having once made such precheck, she can rely on the prewarning indexing signals to alert her as to the points where she must divert her attention towards incorporating the corrected material. While such precheck is advisable and helpful it is not necessary in the usual run of transcribing dictation because the usual correction pertains only to a word or so immediately at the correction point. Thus, even if the index slip were lost, a secretary could proceed with the typing from beginning to end of a dictation unit and rely solely on the prewarning indexing signals to alert her as to each correction point with fair assurance that she would not make any mistake of typing erroneous material that would require the discarding of the subject matter already typed.

The particular embodiment of my invention herein shown and described is intended to be illustrative and not necessarily limitative of my invention since the same is subject to changes and modifications without departure from the scope of my invention, which I endeavor to express according to the following claim.

I claim:

In a dictation recording machine: the combination of means for supporting a record medium for rotation, a recorder head, drive means for producing a traveling movement between said head and record medium during rotation of the latter to cause the head to describe successive track convolutions on the record medium, an indexing head carried with said recorder head in registration with the track described by the recorder head and at a predetermined distance back from the recorder head, a microphone, an indexing relay, an amplifier, circuit means for connecting said microphone to the input of said amplifier and the output of the amplifier to said recorder head, means for controlling said indexing relay, a source of index warning signal, and means responsive to operation of said indexing relay to start said drive means and to disconnect said amplifier from said microphone and recorder head and thereupon to connect said source of warning signal to the input of said amplifier and to connect the output of said amplifier to said indexing head.

References Cited

UNITED STATES PATENTS

| | | | |
|---|---|---|---|
| 2,333,235 | 11/1943 | Clausen | 179—100.2 X |
| 2,803,707 | 8/1957 | Taylor et al. | 179—100.1 |

BERNARD KONICK, *Primary Examiner.*

R. MORGANSTERN, *Assistant Examiner.*